Sept. 1, 1959 P. C. SMITH 2,902,304
FREE FLOATING PIN
Filed Nov. 20, 1956 2 Sheets-Sheet 1
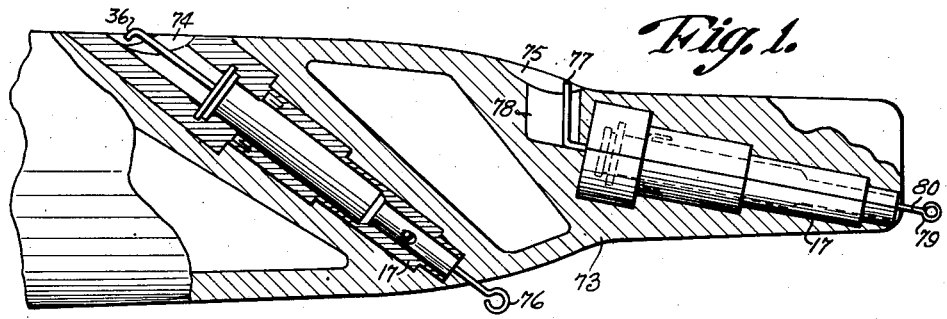
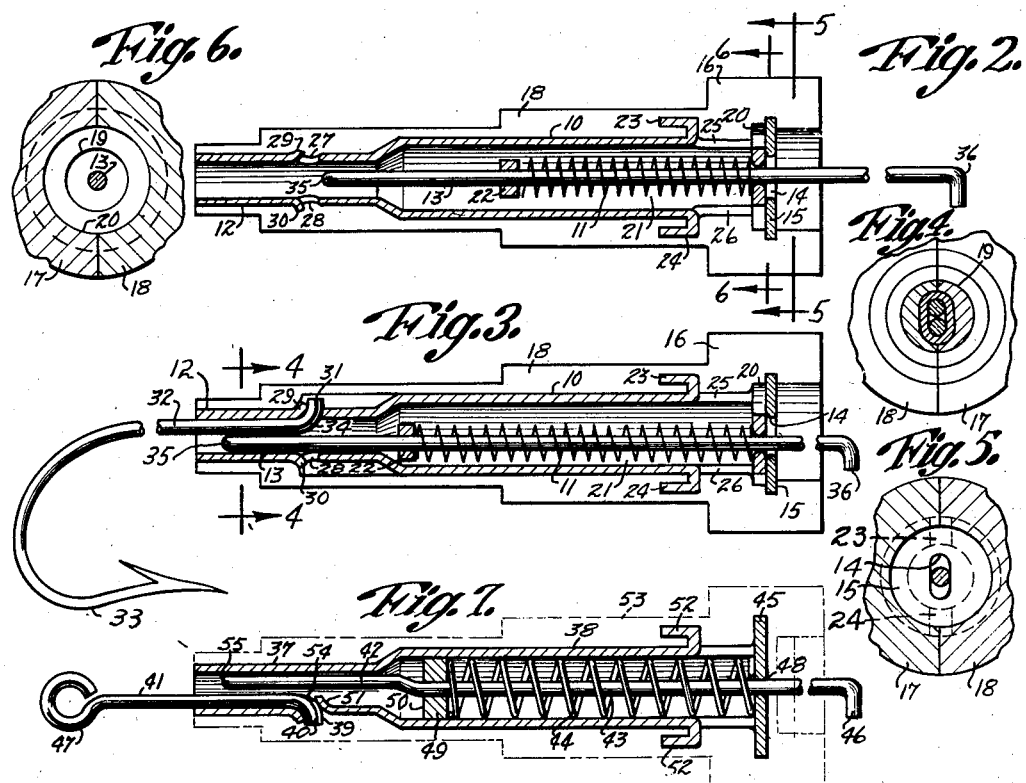
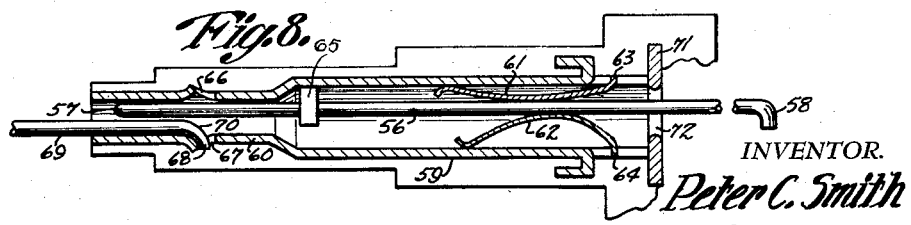
INVENTOR.
Peter C. Smith
BY Victor J. Evans & Co.
ATTORNEYS Sept. 1, 1959                P. C. SMITH                2,902,304
                          FREE FLOATING PIN Filed Nov. 20, 1956                              2 Sheets-Sheet 2

INVENTOR.
PETER C. SMITH
BY
*Victor J. Evans & Co.*
ATTORNEYS

United States Patent Office 2,902,304
Patented Sept. 1, 1959

2,902,304

FREE FLOATING PIN

Peter C. Smith, Perth Amboy, N.J.

Application November 20, 1956, Serial No. 623,331

1 Claim. (Cl. 287—103)

This invention relates to fish lures and couplings of the type having a fish hook or eye removably mounted in a lure or other device, and in particular an insert adapted to be embedded or molded in the body of a plug or lure in which a hook, eye, or other device having a shank with a projection on the end thereof is locked in an opening in a shell of the device by a floating pin and wherein upon manually withdrawing the pin the hook, eye, or the like is released so that it may readily drop from the holding device.

Reference is made to my co-pending applications with the Serial Numbers 611,953 and 624,921, showing similar structure.

The purpose of this invention is to provide a fish lure having fish hooks depending therefrom in which the hooks are readily released from the lure and in which the hooks or the like may readily be replaced and locked in operative positions in the lure.

Various types of plugs and lures have been provided for use in fishing, however, in substantially all types of lures the hooks are permanently mounted in the body of the lure or permanently attached to eyes secured in the body of the lure and when it is desired to remove a fish from a lure, particularly where the fish is unusually active, such as in the case of an eel, it is desirable to release the hook so that another hook may be inserted in the lure and fishing continued as the former hook is removed from the fish. With this thought in mind this invention contemplates a fishing lure having a removable hook, eye, or other device mounted therein in which the hook, eye, or other device is locked in an opening by a floating pin whereby the point of the hook may extend toward either side of the lure and wherein the floating pin is snapped into locking position in the shank of the hook, eye, or the like by springs positioned around the pin.

The object of this invention is, therefore, to provide means for securing a fish hook in a lure whereby the hook may readily be released by withdrawing locking means thereof.

Another object of the invention is to provide a mounting for a fish hook, eye, or the like in a lure or other device in which it is only necessary to slide the shank of a hook, eye, or the like into an opening in the end of the device in order to permanently lock the hook, eye, or other device in the lure.

A further object of the invention is to provide an improved mounting for a fish hook, eye, or the like wherein the hook, eye, or the like is readily inserted in the lure and also readily released therefrom in which the device is of a simple and economical construction.

With these and other objects and advantages in view the invention embodies an elongated tubular member having a flange with an elongated slot therein at one end and with a pin extended through the slot and urged inwardly by a spring to force a projection on the end of a shank of a hook, eye or the like into an opening in a side of the tube whereby the pin locks the hook or other device in a lure or the like and wherein the locking pin is readily withdrawn by a projection on the outer end thereof to release the shank of the hook from the device.

Other features and advantages of the invention will appear from the following description taken in connection with the drawing, wherein:

Figure 1 is a longitudinal section through a portion of a plug or lure showing inserts embedded in the body of the lure, one of the inserts being shown in section and the other in elevation.

Figure 2 is a longitudinal section through the lure taken on a point between two semi-circular units forming a housing for the lure, the parts being shown in the free positions.

Figure 3 is a longitudinal section, similar to that shown in Fig. 2, showing a projection on the end of a shank of a fish hook retained in an opening in the tube of the lure by a pin.

Figure 4 is a cross section through the lure taken on line 4—4 of Fig. 3 with the parts shown on an enlarged scale.

Figure 5 is a cross section through the lure taken on line 5—5 of Fig. 2 also with the parts shown on an enlarged scale and showing the elongated opening in a disc in the head of the lure, the sides of the lure being broken away.

Figure 6 is a cross section through the head of the lure showing a sliding washer mounted on a floating pin extended through the lure and with the pin extended through an opening, in the washer positioned in the head of the lure.

Figure 7 is a longitudinal section through the fish hook or eye mounting device in which the inner end of a locking pin is offset to correspond with the position of an opening into which a projection on the end of a hook or eye may be forced.

Figure 8 is a similar section showing a further modification wherein a floating pin is suspended between flat springs whereby a projection on a shank of a hook, eye, or the like may be urged toward either side of a tube into which the end of the shank is inserted.

Figure 9:
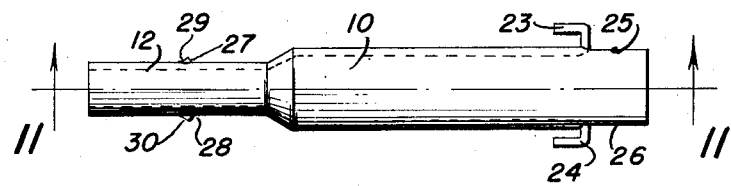
Figure 9 is a side elevational view of the spring barrel with other parts of the coupling omitted.
Figure 10:
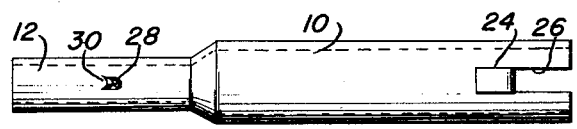
Figure 10 is a plan view of the spring barrel.
Figure 11:
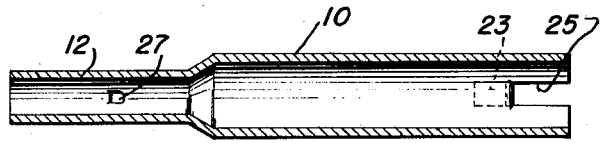
Figure 11 is a longitudinal section through the spring barrel taken on line 11—11 of Figure 9.

Referring now to the drawing wherein like reference characters denote corresponding parts the improved removable hook fish lure of this invention includes a tubular body having an enlarged section 10 forming a barrel for a spring 11 and a small section 12 for receiving a shank of a fish hook and a cam, a pin 13 extended through an elongated opening 14 in a washer 15 in a head 16 of an insert including semi-circular sections 17 and 18, a floating disc 19 mounted on the pin 13 and positioned to slide in a slot 20 adjacent the washer 15, and a spring 21 extended around the pin 13 and positioned between a set collar 22 and a disc 19.

The tube 10 is provided with fingers 23 and 24 that are struck from openings 25 and 26 in upper and lower surfaces of the tube 10 and the fingers are embedded in the material of the sections 17 and 18 providing locking means for retaining the sections in assembled relation and in position around the tubular member including the portions 10 and 12.

The portion 12 of the tube which is formed with semi-circular end portions connected with flat sides is provided with openings 27 and 28 with arcuate projections 29 and 30 formed from outer portions thereof and extended outwardly and, as illustrated in Fig. 3 the projection 31 on the end of a shank 32 of a hook 33 is forced into one of the openings 27 and 28 as the shank with the hook or eye is inserted in the end of the tube 12. In inserting the shank in the portion 12 of the tube the arcuate surface 34 at the end of the shank engages the nose or cam surface 35 of the pin 13 whereby the projection 31 is forced upwardly or downwardly, depending upon the position to which the hook 33 is turned, and with continued movement of the shank and pin 13 the projection 31 is forced into one of the openings 27 or 28 and with the movement of the pin 13 continued the projection 31 is locked in the opening 27 and retained therein by the pin 13. When it is desired to release the hook the pin 13 is drawn outwardly by a handle 36 on the extended end thereof and as the nose 35 of the pin passes beyond the openings 27 and 28 the shank of a hook or eye drops from the opening in which the projection 31 is positioned whereby the hook or eye is released.

In the modification illustrated in Fig. 7 a tube 37 extends from an end of a spring barrel 38 and the tube 37 is provided with an opening 39 into which a projection 40 on the end of a shank 41 is urged and locked by an offset portion 42 of a pin 43 around which a spring 44 is positioned. The pin 43, which extends through a head 45 on the barrel 38 is provided with a projection 46 by which the pin may be withdrawn to release the shank of the eye 47.

The pin 43 is slidably mounted in an opening 48 in the head 45 and also in an opening 49 in a partition 50 in the end of the spring barrel. An arcuate lip 51 extends inwardly on the inner side of the aperture 50 to provide a stop for the projection 40 and also to form a guide to direct the projection into the aperture. The barrel 38 is also provided with fingers 52 by which the barrel and tube are retained in position in a plastic cover 53.

The shank 41 of the eye 47 is provided with an arcuate end surface 54 which coacts with the cam surface 55 on the end of the section 42 of the pin to guide the projection 40 into the opening 39. The eye or hook is readily released by drawing the pin outwardly by the head or projection 46.

In the modification illustrated in Fig. 8 a floating pin 56 having a cam surface 57 on the inner end and a projection 58 on the outer end is positioned in a barrel 59 from which a tube 60 extends, and in this design, the pin 56 is resiliently held by springs 61 and 62, one of the ends of which are retained in openings 63 and 64 in the sides of the barrel 59 and the springs are positioned to urge the pin 56 to a floating position in the center of the barrel.

The pin 56 is provided with a collar 65 that limits the movement of the pin toward upper or lower inner surfaces of the barrel and with the pin 56 suspended by the springs 61 and 62 the cam end 57 is yieldingly retained in a center position midway between upper and lower walls of the tube 60.

The tube 60 is provided with oppositely disposed openings 66 and 67 into which a projection 68 on the end of a shank 69 of a hook, eye, or the like is urged by the cam surface 57, and the end of the shank is provided with an arcuate surface 70 that coacts with the cam portion 57 to urge the projection 68 into the opening 67.

In this design the end of the barrel 59 is provided with a head 71 in which an opening 72 is provided and with the pin freely held in this manner and urged toward the center by the springs 61 and 62, the cam surface 57 will be retained in the center of the tube 60 and as a shank 69 is urged into the open end of the tube 60 the arcuate surface 70 engages the cam 57 urging the projection 68 into one of the openings 66 or 67.

With the tube embedded in plastic, such as semi-circular plastic sections 17 and 18 the combination of the tube with the plastic sections may be molded or cast in a plug or lure, such as the lure 73 and the extended ends of the pin may extend into recesses 74 and 75 whereby a projection 36 may readily be engaged to draw the pin outwardly to release an eye 76, or, where an offset outer end 77 is required the end of the pin may extend outwardly through an opening 78 and into the recess 75 whereby the pin 13, with a cam surface thereon may be withdrawn to release a hook or eye, such as the eye 79 which is carried by a shank 80.

The portion 77 of a pin, such as the pin 13, is similar to the projection 36 except that the length thereof is extended to reach into the recess 75, however, it will be understood that the portion extended outwardly from the end of the pin may be formed similar to the projection 36, or similar to the extension 77, or as may be desired.

The projection on the inner end of the hook or eye is urged by the cam surface on the end of the pin, such as the pin 13 into one of the openings of the tube and with a fishing line attached to the lure the device may be used in the conventional manner.

With the tube 12 elongated in cross section the projection on the end of the shank of a fish hook or other device or the arcuate end of the shank is retained in position in alignment with one of the openings in the edges of the elongated section whereby upon engagement of the arcuate surface of the shank with the cam surface on the end of the pin the projection or arcuate end is urged into the opening in the edge of the tube.

However, in numerous instances it is difficult to release a fish from a hook or remove a hook from the mouth of a fish and in such instances the cam surface at the end of the pin may be separated from the shank of the hook or eye by drawing the pin, such as the pin 13 away from the shank of the hook so that the hook will be released and replaced by another hook so that fishing may be continued.

It will be understood that other modifications, within the scope of the appended claim, may be made in the design and arrangement of the parts without departing from the spirit of the invention.

What is claimed is:

In a coupling, the combination which comprises a tube having a spring barrel forming one end and a portion elongated in cross section forming the other end and extended from an end of the barrel, said portion elongated in cross section having openings in opposite edges of the wall thereof, a fish hook having a shank and said shank having an arcuate extended end, a free floating pin having a projection on the outer end and a cam surface on the inner end extended through the barrel portion of the tube and positioned with the cam surface extended to engage the end of the shank of the fish hook, for guiding the arcuate extended end of the shank of the fish hook into one of the openings of the tube, a collar fixedly mounted on the pin, a washer having an elongated slot therein positioned at one end of the barrel portion of the tube, a disc having an opening therethrough positioned against the inner surface of the washer, and a spring extended around the pin positioned between the collar and disc.

References Cited in the file of this patent

UNITED STATES PATENTS

| 2,556,117 | Smith | June 5, 1951 |
| 2,716,832 | Minnie | Sept. 6, 1955 |

FOREIGN PATENTS

| 895,334 | France | Apr. 3, 1944 |